United States Patent
Jadhav et al.

(10) Patent No.: US 11,774,248 B2
(45) Date of Patent: Oct. 3, 2023

(54) SYSTEMS AND METHODS FOR PERFORMING INCLUSIVE INDOOR NAVIGATION

(71) Applicant: Tata Consultancy Services Limited, Mumbai (IN)

(72) Inventors: Charudatta Jadhav, Mumbai (IN); Govind Rajput, Mumbai (IN); Achampet Harshavardhan, Mumbai (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 266 days.

(21) Appl. No.: 17/145,145

(22) Filed: Jan. 8, 2021

(65) Prior Publication Data

US 2021/0231440 A1    Jul. 29, 2021

(30) Foreign Application Priority Data

Jan. 14, 2020 (IN) .............................. 202021001718

(51) Int. Cl.
- *G01C 21/20* (2006.01)
- *G06V 20/20* (2022.01)
- *H04W 4/024* (2018.01)

(52) U.S. Cl.
CPC .......... *G01C 21/206* (2013.01); *G06V 20/20* (2022.01); *H04W 4/024* (2018.02)

(58) Field of Classification Search
CPC ......................... G01C 21/206; G01C 21/3807; G01C 21/387; G06V 20/20; H04W 4/024
See application file for complete search history.

(56) References Cited

U.S. PATENT DOCUMENTS

| | | | |
|---|---|---|---|
| 10,012,509 B2 * | 7/2018 | Almalki | G01C 21/165 |
| 2006/0184318 A1 * | 8/2006 | Yoshimine | A61F 9/08 |
| | | | 701/433 |

(Continued)

FOREIGN PATENT DOCUMENTS

| | | |
|---|---|---|
| CN | 109029444 A | 12/2018 |
| CN | 106840158 B | 11/2019 |

(Continued)

OTHER PUBLICATIONS

Apostolopoulos, Ilias et al, "Integrated Online Localization and Navigation for People with Visual Impairments using Smart Phones", IEEE International Conference on Robotics and Automation, 2012, IEEE, https://www.cs.rutgers.edu/~kb572/pubs/ICRA12_1454_FI.pdf.

(Continued)

*Primary Examiner* — Anne Marie Antonucci
*Assistant Examiner* — Patrick Daniel Mohl
(74) *Attorney, Agent, or Firm* — Finnegan, Henderson, Farabow, Garrett & Dunner LLP (57) ABSTRACT

This disclosure relates to systems and methods for performing inclusive indoor navigation. State of the art systems and methods require extra hardware and fail to provide accurate localization and navigation with less precision. The method of the present disclosure obtains a nested environment data of a facility and estimate current spatial location of a user in the nested environment using surrounding recognition machine learning model. An optimal path categorized as convenient path, shortest path and multi-destination path from the current spatial location to a destination is determined. The current spatial location of the user is tracked on the optimal path using an augmented reality technique when navigation starts. The optimal path is dynamically updated based on feedback obtained from one or more user interac- (Continued)

tion modalities. The present disclosure provides user navigation with last meter precision, and no hardware and internet dependency.

11 Claims, 5 Drawing Sheets

(56) References Cited

U.S. PATENT DOCUMENTS

| | | | |
|---|---|---|---|
| 2015/0002808 A1* | 1/2015 | Rizzo, III | A61N 1/36046 |
| | | | 351/158 |
| 2015/0185022 A1* | 7/2015 | Yoo | H04W 4/024 |
| | | | 701/408 |
| 2015/0324646 A1* | 11/2015 | Kimia | G06T 7/80 |
| | | | 348/62 |
| 2019/0128675 A1* | 5/2019 | Kar | G01C 21/3438 |
| 2019/0234743 A1* | 8/2019 | Roy | G06F 16/29 |
| 2020/0050894 A1* | 2/2020 | Park | G06K 9/6256 |
| 2021/0018929 A1* | 1/2021 | Choi | G05D 1/0274 |
| 2021/0041246 A1* | 2/2021 | Kukreja | H04W 4/024 |
| 2021/0209713 A1* | 7/2021 | Imtiyaz | G06Q 50/30 |

FOREIGN PATENT DOCUMENTS

| | | | |
|---|---|---|---|
| WO | WO-2015083150 A1 * | 6/2015 | G01C 21/12 |
| WO | WO2018223490 | 12/2018 | |
| WO | WO2020034165 A1 | 2/2020 | |

OTHER PUBLICATIONS

Hayashi, Hiromichi et al., "A Comprehensive Survey of Navigation Systems for the Visual Impaired", Navigation assistive technology for visually impaired individuals, Jun. 2019, ARXIV, https://arxiv.org/pdf/1906.05917.pdf.

Meneguzzi, Felipe et al., "Predictive Indoor Navigation using Commercial Smart-phones", ACM Symposium on Applied Computing, Jun. 2013, pp. 519-525, ACM, https://www.ri.cmu.edu/pub_files/2011/12/percom-navigation-main.pdf.

Kha, Dawar et al., "A Generic Approach toward Indoor Navigation and Pathfinding with Robust Marker Tracking", Remote Sensing, Dec. 2019, MDPI, https://www.researchgate.net/publication/337974895_A_Generic_Approach_toward_Indoor_Navigation_and_Pathfinding_with_Robust_Marker_Tracking/link/5df8cbed299bf10bc3615fa1/download.

Joseph, Samleo L. et al., "Semantic indoor navigation with a blind-user oriented augmented reality", International Conference on Systems, Man, and Cybernetics, Oct. 2013, IEEE, pp. 3585-3591, http://citeseerx.ist.psu.edu/viewdoc/download?doi=10.1.1.669.1393&rep=rep1&type=pdf.

Liu, Liu et al., "A "door-to-door" path-finding approach for indoor navigation", Indoor Semantic Modeling to Support Path-Finding, May 2011, Research Gate, pp. 3585-3591, https://citeseerx.ist.psu.edu/viewdoc/download?doi=10.1.1.1070.9849&rep=rep1&type=pdf.

* cited by examiner

SYSTEMS AND METHODS FOR PERFORMING INCLUSIVE INDOOR NAVIGATION

PRIORITY CLAIM

This U.S. patent application claims priority under 35 U.S.C. § 119 to: Indian provisional patent application no. 202021001718, filed on Jan. 14, 2020. The entire contents of the aforementioned application are incorporated herein by reference.

TECHNICAL FIELD

The disclosure herein generally relates to field of indoor positioning system, and more particularly to system and method for performing inclusive indoor navigation for assisting physically challenged subjects.

BACKGROUND

Indoor navigation including locating a user with high precision and finding way to a desired destination in a new environment is a challenging task. Further, users with disabilities have more limitations because of their physical challenges and hence there is a bigger need for navigational assistance for disabled users than mainstream users. Global Positioning System (GPS) being most popular solution for outdoor navigation fails to show navigation accurately due to precision issues and its more challenging for indoor as GPS cannot be used for indoor environment. Traditional systems which include Indoor Positioning System (IPS) provide turn by turn directional assistance using Bluetooth beacons, RFID tags, Wi-Fi signature, GPS and geographic information system (GIS) with IoT may fail to provide accurate localization and navigation in real time as especially required by person with disabilities.

SUMMARY

Embodiments of the present disclosure present technological improvements as solutions to one or more of the above-mentioned technical problems recognized by the inventors in conventional systems. In an aspect, there is provided a processor implemented method, the method comprising: obtaining, by one or more hardware processors, a nested environment data of a facility under consideration for indoor navigation performed by a user, wherein the nested environment data is connected to a server, and wherein the nested environment data of the facility is obtained by: creating a two-dimensional digital map for each floor among a plurality of floors of the facility, determining a nested map of the facility by sequentially arranging two-dimensional digital maps created for each floor of the facility, and performing map labelling to localize and capture information of a plurality of landmarks in the nested map; receiving, by the one or more hardware processors, a destination within the facility from the user; estimating, using a surrounding recognition machine learning model implemented by the one or more hardware processors, a current spatial location of the user with a predefined precision range at centimeter (cm) level by identifying (i) a user specific area in the facility using the surrounding recognition machine learning model trained with a plurality of real world images of the facility and (ii) the current spatial location of the user with respect to the identified user specific area by triangulating input data received from a plurality of sensors; determining, by the one or more hardware processors, an optimal path from the current location to the destination using the nested environment data, wherein the optimal path from the current location to the destination is categorized as at least one of (i) a convenient path (ii) multi-destination path, (iii) shortest path in accordance with one or more user constraints; tracking, using an augmented reality technique implemented by the one or more hardware processors, the current spatial location of the user while user navigates on the optimal path from the current location to the destination; and dynamically updating, by the one or more hardware processors, the optimal path from the tracked current spatial location of the user to the destination based on feedback obtained from one or more user interaction modalities.

In another aspect, there is provided a system, the system comprising: one or more data storage devices operatively coupled to one or more hardware processors and configured to store instructions configured for execution via the one or more hardware processors to: obtain, by one or more hardware processors, a nested environment data of a facility under consideration for indoor navigation performed by a user, wherein the nested environment data is connected to a server, and wherein the nested environment data of the facility is obtained by: creating a two-dimensional digital map for each floor among a plurality of floors of the facility, determining a nested map of the facility by sequentially arranging two-dimensional digital maps created for each floor of the facility, and performing map labelling to localize and capture information of a plurality of landmarks in the nested map; receive, by the one or more hardware processors, a destination within the facility from the user; estimate, using a surrounding recognition machine learning model implemented by the one or more hardware processors, a current spatial location of the user with a predefined precision range at centimeter (cm) level by identifying (i) a user specific area in the facility using the surrounding recognition machine learning model trained with a plurality of real world images of the facility and (ii) the current spatial location of the user with respect to the identified user specific area by triangulating input data received from a plurality of sensors; determine, by the one or more hardware processors, an optimal path from the current location to the destination using the nested environment data, wherein the optimal path from the current location to the destination is categorized as at least one of (i) a convenient path (ii) multi-destination path, (iii) shortest path in accordance with one or more user constraints; track, using an augmented reality technique implemented by the one or more hardware processors, the current spatial location of the user while user navigates on the optimal path from the current location to the destination; and dynamically update, by the one or more hardware processors, the optimal path from the tracked current spatial location of the user to the destination based on feedback obtained from one or more user interaction modalities.

In yet another aspect, there is provided one or more non-transitory machine readable information storage mediums comprising one or more instructions which when executed by one or more hardware processors causes: to: obtain, by one or more hardware processors, a nested environment data of a facility under consideration for indoor navigation performed by a user, wherein the nested environment data is connected to a server, and wherein the nested environment data of the facility is obtained by: creating a two-dimensional digital map for each floor among a plurality of floors of the facility, determining a nested map of the facility by sequentially arranging two-dimensional digital maps created for each floor of the facility, and performing map labelling to localize and capture information of a plurality of landmarks in the nested map; receive, by the one or more hardware processors, a destination within the facility from the user; estimate, using a surrounding recognition machine learning model implemented by the one or more hardware processors, a current spatial location of the user with a predefined precision range at centimeter (cm) level by identifying (i) a user specific area in the facility using the surrounding recognition machine learning model trained with a plurality of real world images of the facility and (ii) the current spatial location of the user with respect to the identified user specific area by triangulating input data received from a plurality of sensors; determine, by the one or more hardware processors, an optimal path from the current location to the destination using the nested environment data, wherein the optimal path from the current location to the destination is categorized as at least one of (i) a convenient path (ii) multi-destination path, (iii) shortest path in accordance with one or more user constraints; track, using an augmented reality technique implemented by the one or more hardware processors, the current spatial location of the user while user navigates on the optimal path from the current location to the destination; and dynamically update, by the one or more hardware processors, the optimal path from the tracked current spatial location of the user to the destination based on feedback obtained from one or more user interaction modalities.

In accordance with an embodiment of the present disclosure, the one or more user constraints used for categorization of the optimal path include user profiling information, information of landmark of interest, distance from an initial location of the user to the destination, and time to reach the destination.

In accordance with an embodiment of the present disclosure, the predefined precision range of the current spatial location of the user is 10 cm-20 cm.

In accordance with an embodiment of the present disclosure, the step of tracking includes avoiding disorientation and side wall bumping of the user based on a deviation in direction of the user from a preplanned direction on the optimal path.

In accordance with an embodiment of the present disclosure, the feedback obtained from the one or more user interaction modalities for dynamically updating the optimal path includes feedback obtained from the obstacle detector, haptic feedback, voice instructions-based feedback, and visual interactions-based feedback.

In accordance with an embodiment of the present disclosure, the method further comprising detecting one or more obstacles present on the optimal path using an obstacle detector, wherein the obstacle detector detects one or more obstacles using a combination of (i) computer vision techniques utilizing a plurality of data continuously captured by a camera to detect the one or more obstacles with a first range of view and (ii) one or more ultrasonic sensors to detect the one or more obstacles with a second range of view, and wherein the plurality of data continuously captured by the camera helps in determining pattern of the one or more obstacles and is provided as input to the one or more ultrasonic sensors for prediction of one or more incoming obstacles based on the determined pattern.

BRIEF DESCRIPTION OF THE DRAWINGS

The accompanying drawings, which are incorporated in and constitute a part of this disclosure, illustrate exemplary embodiments and, together with the description, serve to explain the disclosed principles.

It should be appreciated by those skilled in the art that any block diagrams herein represent conceptual views of illustrative systems and devices embodying the principles of the present subject matter. Similarly, it will be appreciated that any flow charts, flow diagrams, and the like represent various processes which may be substantially represented in computer readable medium and so executed by a computer or processor, whether or not such computer or processor is explicitly shown.

DETAILED DESCRIPTION OF EMBODIMENTS

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the scope being indicated by the following claims.

The embodiments herein provide a system and method for performing inclusive indoor navigation. In multiple scenarios, whenever a user visit in any unfamiliar environment, it is a challenge to find the way to desired destination. For example, if a person, who is visiting a mall for the first time, wants to go to a specific store has to know where the store is, if it is open or if the store is too crowded. Similarly, in case of an airport, where a person is visiting for the first time and wants to explore the airport and at the same time keep track of the flight to catch. Also, in case of book exhibition where the user wants to go to a particular author's stall, he needs to know one or more informative factors such as where the stall is, till when is it open and if the stall is too crowded so that he can explore the rest of the book exhibition. Similarly, in case of an educational institute which might have multiple wings of different departments including physics, chemistry, a person may need to go to kinematics lab on second floor of physics department building. In case of hospital, if the user enters an unfamiliar hospital and goes to OPD (Outpatient Department) then as he/she shares his/her case papers, he/she should be automatically guided to the medical or to a lab for further checkup.

However, different type of challenging and complex situations are required to be addressed for different types of users in indoor navigation. For example, for a visually challenged user, indoor navigation becomes more challenging since the visually challenged user may require a specific directional assistance with highest precision to stick to a path and avoid deviation from the path to reach the destination, along with surrounding information and obstacle detection. Similarly, a wheelchair bound user may needs a path wide enough for the wheelchair to pass and the guided path should always avoid hurdles like staircase, stepping, and the like, even if the path is not shortest. Also, for an elderly user, a proactive approach is needed to guide the user through a path that address his old age limitations.

State of the art systems and methods use Bluetooth beacon based indoor positioning system (IPS) technology which gives an accuracy of about 2 meters for localization which might be negligible for mainstream user but for a person with disability (e.g., visually impaired), it creates a huge difference as his/her whole turn would be changed by two meters while route requires precision in centimeters, a strategic positioning and dependency on extra hardware. Further, RFID based systems give an accuracy of 20-50 cm and have lower proximity range wherein the user needs to carry the RFID tag along. Furthermore, conventional Wi-Fi signature technology-based systems rely on signal strength at different locations in indoor environment, need extensive data collection and give an accuracy of about 2-3 meters. Traditional systems also utilize augmented reality (AR) for purpose of navigation wherein starting point is kept fixed, localization is done using markers which may affect look and feel of the indoor environment. However, for visually impaired users, use of the augmented reality (AR) alone may not suffice in guiding the user to stick to a path without deviating and moving close to the walls. Thus, state of the art methods lack in providing last meter precision, localization, require extra hardware or internet dependency.

The system of present disclosure enhances user experience and solves challenges of people with disabilities while abiding by law and creating differential experience. The system of present disclosure is an indoor positioning system (IPS) which is user centric, inclusive and solves last-meter localization problem with no hardware dependency which means there is no need of extra hardware to be setup in a target indoor environment. In context of the present disclosure, the term 'inclusive' is used because of the broader reach of the system of the present disclosure addressing physical limitations of a person with disability like wheelchair bound, visually impaired, elderly people and the like. Further, the system of the present disclosure include mainstream users also and bring them to a level ground in terms of navigation in an environment. Further, the system of present disclosure performs indoor navigation with on device path planning, user localization without internet and by utilizing capabilities of augmented reality (AR), computer vision (CV), machine learning (ML), and artificial intelligence (AI) based techniques. The device herein may be a personal digital assistant (PDA), a tablet a mobile or the like. The augmented reality (AR) based technique provides an integration of accelerometer, gyroscope and camera which is used for identifying spatial position and tracking of the user in real time as he/she moves in the indoor environment. The computer vision (CV) and the machine learning (ML) based techniques are used for map creation, localization and obstacle detection. In the proposed disclosure, the artificial intelligence (AI) based techniques are used for creating user profiling information (alternatively referred as user persona) with real time user attributes and pre-fed basic details of the user such as name, age, and the like. Further, the artificial intelligence based techniques are used for determining optimal path including a convenient path that can have multiple destinations for routing disabled user (e.g., a wheelchair bound user along a path wide enough for smooth wheelchair passage avoiding all the hurdles like staircase, stepping). While, convenient path for a mainstream user in a crowded place takes the user from one destination to the other keeping reference of crowd from minimum to maximum. Further the optimal path includes multi-destination path (in case of museums, amusement parks) and shortest path.

Referring now to the drawings, and more particularly to FIG. 1 through FIG. 5, where similar reference characters denote corresponding features consistently throughout the figures, there are shown preferred embodiments and these embodiments are described in the context of the following exemplary system and/or method.

Figure 1:
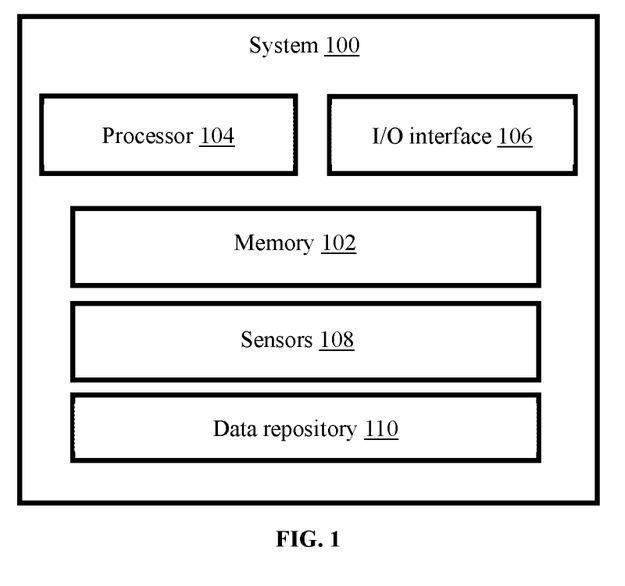
FIG. 1 illustrates an exemplary block diagram of a system for performing inclusive indoor navigation, in accordance with some embodiments of the present disclosure.

FIG. 1 illustrates an exemplary block diagram of a system for performing inclusive indoor navigation, in accordance with some embodiments of the present disclosure. In an embodiment, the system 100 includes one or more processors 104, communication interface device(s) or input/output (I/O) interface(s) 106, and one or more data storage devices or memory 102 operatively coupled to the one or more processors 104. The one or more processors 104 that are hardware processors can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In the context of the present disclosure, the expressions 'processors' and 'hardware processors' may be used interchangeably. In an embodiment, the system 100 can be implemented in a variety of computing systems, such as laptop computers, notebooks, workstations, mainframe computers, servers, a network cloud, hand-held devices such as mobile devices (e.g. smartphones) and the like. In an embodiment, the processor 104, the I/O interface 106, and the memory 102, may be coupled by a system bus.

The I/O interface 104 may include a variety of software and hardware interfaces, for example, a web interface, a graphical user interface, and the like. The interfaces 104 may include a variety of software and hardware interfaces, for example, interfaces for peripheral device(s), such as a keyboard, a mouse, an external memory, a camera device, and a printer. The interfaces 104 can facilitate multiple communications within a wide variety of networks and protocol types, including wired networks, for example, local area network (LAN), cable, etc., and wireless networks, such as Wireless LAN (WLAN), cellular, or satellite. For the purpose, the interfaces 104 may include one or more ports for connecting a number of computing systems with one another or to another server computer. The I/O interface 104 may include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 102. The one or more modules (not shown) of the system 100 stored in the memory 102 may include routines, programs, objects, components, data structures, and so on, which perform particular tasks or implement particular (abstract) data types. In an embodiment, the memory 102 includes a data repository 110 for storing data processed, received, and generated by the one or more hardware processors 104.

The data repository 110, amongst other things, includes a system database and other data. In an embodiment, the data repository 110 may be external (not shown) to the system 100 and accessed through the I/O interfaces 104. The memory 102 may further comprise information pertaining to input(s)/output(s) of each step performed by the processor 104 of the system 100 and methods of the present disclosure. In an embodiment, the system database stores information being processed at each step of the proposed methodology. The other data may include, data generated as a result of the execution of the one or more hardware processors 104 and the one or more modules (not shown) of the system 100 stored in the memory 102.

The system 100 further includes a plurality of sensors 108 which includes an accelerometer, a gyroscope, a magnetometer, a camera, an ultrasonic sensor, a Bluetooth, a GPS (global positioning system), an obstacle detector, a Wi-Fi sensor, and the like. In an embodiment, the obstacle detector refers to a small device that could be connected to a handheld device such as smartphone and can be carried by user in pocket.

In an embodiment, the system 100 of the present disclosure can be configured to reduce the manual intervention. A detailed description of the above-described system and method for performing inclusive indoor navigation is shown with respect to illustrations represented with reference to FIG. 1 through FIG. 5 and use case examples.

Figure 2:
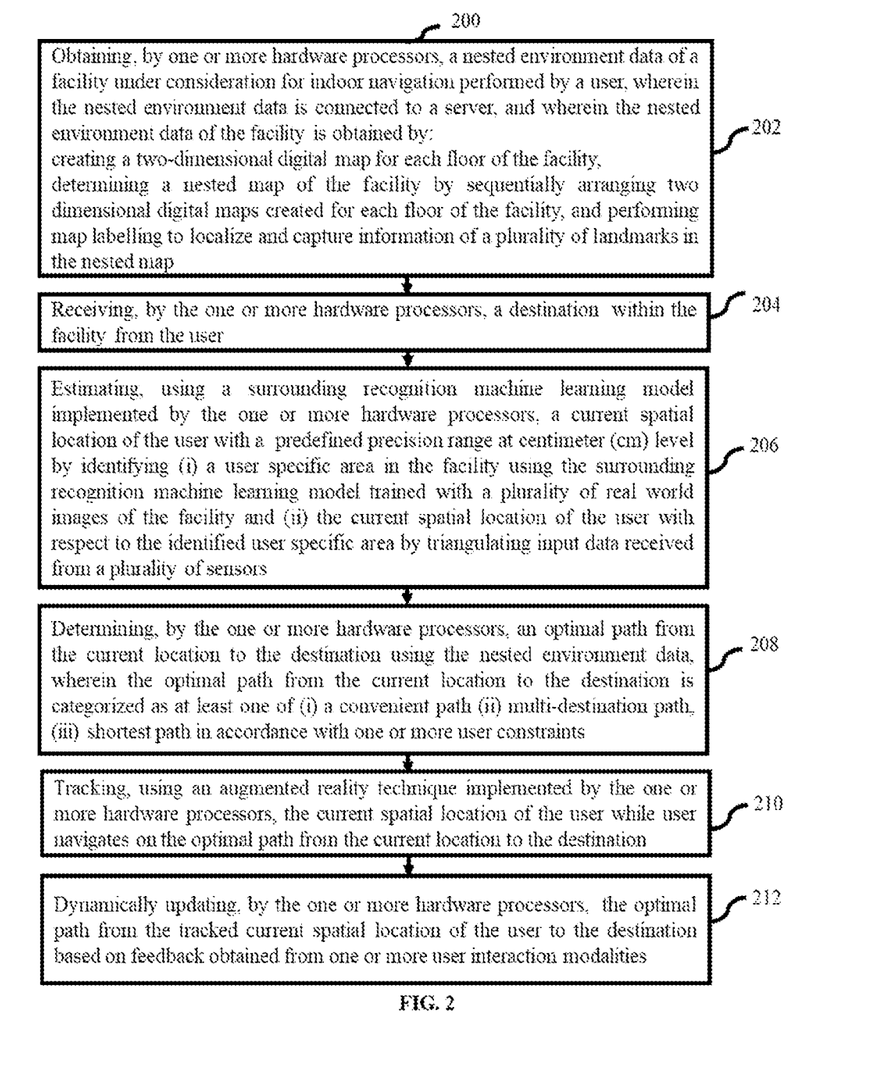
FIG. 2 is an exemplary flow diagram of a processor implemented method for performing inclusive indoor navigation, in accordance with some embodiments of the present disclosure.

FIG. 2, with reference to FIG. 1, is an exemplary flow diagram of a processor implemented method for performing inclusive indoor navigation, using the system 100 of FIG. 1, in accordance with some embodiments of the present disclosure. In an embodiment, the system 100 includes one or more data storage devices or memory 102 operatively coupled to the one or more processors 104 and is configured to store instructions configured for execution of steps of the method 200 by the one or more processors 104. The steps of the method 200 will now be explained in detail with reference to the components of the system 100 of FIG. 1. Although process steps, method steps, techniques or the like may be described in a sequential order, such processes, methods and techniques may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

Referring to FIG. 2, at step 202, the one or more processors 104 are configured to obtain a nested environment data of a facility under consideration for indoor navigation performed by a user. In an embodiment, the facility under consideration may include but not limited to a school building, a mall, a hospital, railway stations, airports, and/or the like. The nested environment data of the facility is obtained by creating a two-dimensional digital map for each floor among a plurality of floors of the facility, determining a nested map of the facility by sequentially arranging two-dimensional digital maps created for each floor among a plurality of floors of the facility, and performing map labelling to localize and capture information of a plurality of landmarks in the nested map. In an embodiment, prior to creation of the two-dimensional digital map, floor exit maps of a given floor of the facility are evaluated against an evaluation criterion. In an embodiment, the evaluation criterion is used to check real world architectural details of the facility such as dimension-based precision of an existing map of the facility and positioning of landmarks in surrounding environment with respect to information provided by a client. Here, the term 'client' is different from the user and is referred for a person who wants the indoor navigation to be performed in his/her facility. Here, the existing map is different from the two-dimensional digital map that is created. Further, if the floor exit maps do not meet the evaluation criteria then their respective two-dimensional (2D) digital maps are created and arranged as per their sequence of existence to create the nested map of the facility. Here, the sequence of existence means first ground floor then first floor as so on. Further, map labelling (alternatively referred as landmarking) is performed on respective map of the nested maps. Here, map labelling refers to adding details to different landmarks with respect to the created two-dimensional digital map along with noting/capturing surrounding information of the landmark including its unique aspects such as presence of a fountain, a picture, and/or the like. Here, the details of the landmarks may include but not limited to how the surroundings are, name of the landmark, and/or the like. Also, each landmark is tagged to a unique reference surroundings for identification based on one or more parameters such as images of the landmark, text or signages present, direction of the landmark, additional images like QR codes or pictures, Wi-Fi signal strength and magnetic field intensity of the area. These one or more parameters distinguish one landmark from other landmarks. Furthermore, direction of indoor environment such as geospatial orientation and GPS location are captured to tag the nested environment data to respective geographic location. Further, these details are used in giving feedback to the user and in giving environmental information to the user. In an embodiment, the nested environment data is connected to a server or a local device such as mobile phone which makes the system ready for plug and play for indoor navigation application.

Further, as depicted in step 204 of FIG. 2, the one or more processors 104 are configured to receive a destination within the facility from the user. For example, in a mall, if the user is standing at ground floor, the destination could be a specific store at third floor. Furthermore, as depicted in step 206 of FIG. 2, the one or more processors 104 are configured to estimate using a surrounding recognition machine learning model implemented by the one or more hardware processors, a current spatial location of the user with a predefined precision range at centimetre (cm) level by identifying (i) a user specific area in the facility using the surrounding recognition machine learning model trained with a plurality of real world images of the facility and (ii) the current spatial location of the user with respect to the identified user specific area by triangulating a plurality of input data received from a plurality of sensors. The surrounding recognition machine learning model utilizes a camera to capture real images of surrounding of the facility to identify an area within the facility where the user is present. Further, a plurality of data from the plurality of sensors such as magnetometer, Wi-Fi sensors, and/or the like is captured to identify exact location of the user within the identified area. With the above input data, each parameter act like a validation point to localize the user. The validation points are the then continuously captured for the user specific area finding and then for further positioning of the user. In an embodiment, the surrounding information of the facility may also include but not limited to out of bound areas, distance between each identified landmark in the nested map. For example, a user enters a premise, then the system of the present disclosure captures the surrounding information of the user using a smartphone camera along with additional parameters such as text, direction, Wi-Fi signal strength and the like for unique identification of user location with respect to the environment.

In an embodiment, GPS location of the user is determined before the navigational session starts. The GPS is used to determine the location of the user to load corresponding nested environment data to the server for indoor navigation but not used during the indoor navigational session as it is inaccurate indoors. In other words, the GPS serves a purpose of giving approximate location of the user in order to determine which indoor area the user is entering which is further used for reference to load respective nested environment data to the server or the local device. For example, in a large academic institute, the GPS location is used before the user enters the campus to load the respective nested environment data of the whole campus and then as building in large campuses are kilometres away from each other, thus once the user reaches close to the destination building based on the GPS, the respective building nested environment data is loaded.

In an embodiment, the nested environment implementation can be further understood with example of a hotel where the user wants to go from ground floor to a room on third floor of the hotel. First, as per GPS coordinates, the nested environment data is loaded (locally or via internet) to the server or the local device from which the ground floor's environment data will be loaded. Then, as navigational session starts from the ground floor, the user is guided to stairs or lift to reach the third floor. On reaching the third floor, its environment data is loaded for further navigation to a specific room. Thus, the combined environment data received from the ground floor to the third floor is referred as the nested environment data. In an embodiment, use of GPS is not confined to a location before user enters the environment but it has a broader use to establish a relationship, wherein the relationship could be use of GPS with respect to a country, a city in the country, a campus in the city, a building in the campus and so on. The above mentioned relationship between country, city, building and campus is facilitated by using the GPS. For example, railways or big corporates at country level, multiple campus within a city relationship or multiple buildings in a campus relationship. Further, the GPS helps in scaling a project to as big as country level or city level. For example, in case of railways, the platform where the user is present is determined by a floor using nested environment data and which city the user is present is determined by the GPS. Also, back tracing of the two-dimensional digital map of indoor environment of the facility under consideration can be performed. For example, the back tracing can be performed from the two-dimensional digital map of the indoor environment of the facility, then to the respective building, then to the city, and then to the country, based on the relationship established by using the GPS.

Referring back to FIG. 2, at step 208, the one or more processors 104 are configured to determine an optimal path from the current location to the destination using the nested environment data. In an embodiment, the optimal path could be determined using but not limited to a weighted direct path planning technique. In an embodiment, the optimal path from the current location to the destination is categorized as at least one of (i) a convenient path (ii) multi-destination path, and (iii) shortest path in accordance with one or more user constraints. In an embodiment, the one or more user constraints used for categorization of the optimal path include user profiling information, information of landmark of interest, distance from an initial location of the user to the destination, and time to reach the destination. In context of the present disclosure, the expression 'user profiling information' refers to details of physical appearance of the user and is indicative of whether the user is a physically fit person without any disability, or a person with disabilities such as a visually challenged person, wheel chair bound person, a deaf person, a pregnant person, an elderly person and/or the like. In an embodiment, the user profiling information is generated by capturing a plurality of data pertaining to the user in real time using a camera, a plurality of sensors, and/or the like. For example, picture of the user is captured that can detect age, or detect if the user uses cretches or if the user is sitting on a wheelchair. The captured plurality of data is used by a user profiling machine learning model to generate the user profiling information in real time along with a pre-fed information such as name, age, gender of the user in the system. In an embodiment, the user profiling machine learning model could be but not limited to a deep learning based convolutional neural network built on top of MobileNet Architecture. Over time, the user profiling machine learning model auto tunes itself as per user preferences as well. In an embodiment, the convenient path refers to a path with multiple destinations. The user constraints that are considered for selection of convenient path include user profiling information, minimum time and minimum distance. For a disabled person (e.g. wheelchair bound user), convenient path refers to a path which is wide enough for providing smooth wheelchair passage while routing and help in avoiding all hurdles like staircase, stepping and/or the like. Whereas, for a mainstream user, the convenient path refers to a path in a crowded place which takes the user from one destination to other keeping reference of crowd from minimum to maximum. In an embodiment, the multi-destination path refers to a path that is longest with respect to time and distance, but it covers all important landmarks within indoor environment. Thus, the user constraints that are considered for selection of multi-destination path include landmark of interest. For example, in a museum, a person is taken along a path that covers all attractions of the museum. In an embodiment, the shortest path refers to a path that is shortest with respect to time and distance from start to end in terms of distance. The user constraints that are considered for selection of shortest path include time, user profiling information and distance. For example, in case of a hospital, the path given to a mainstream user will be directly from entry to emergency ward.

Further, as depicted in step 210 of FIG. 2, the one or more hardware processors 104 are configured to track, using an augmented reality technique, the current spatial location of the user while user navigates on the optimal path from the current location to the destination. In an embodiment, the predefined precision range of the current spatial location of the user is 10 cm-20 cm which means last meter precision is possible with the system of present disclosure. In an embodiment, the augmented reality works as an integration of accelerometer, gyroscope and a camera which detects inertial motion or movement of a mobile device (e.g., smartphone) in space with the user, wherein the mobile device is used for implementing the system 100. Here, movement of the mobile device is recognized by a plurality of data received from the plurality of sensors 108 and a plurality of images simultaneously captured by a camera frame used to mark feature points in the nested environment. Further, the plurality of data is stored and periodically overwritten by algorithm of the augmented reality technique and displacement in the marked feature points in the nested environment help in detecting motion of the mobile device, thus, gives tracking of the current spatial location of the user in real time without any dependency on the internet.

In an embodiment, the step of tracking includes avoiding disorientation and side wall bumping of the user based on a deviation in direction of the user from a pre-planned direction on the optimal path. In other words, once navigational session starts during tracking of the current spatial location of the user, it is determined using a magnetometer of the mobile device if the user starts moving in a direction of the optimal path and direction of the user facing is captured and compared. In normal scenarios, the pre-planned direction on the optimal path should help the user to remain in centre of the optimal path. If the user falls out of a range of direction deflection, then he/she tends to bump in the side walls. As a measure to avoid the disorientation and side wall bumping, an alert is generated immediately to get the user (especially visually challenged users) back in direction the path is leading towards.

Referring to FIG. 2, at step 212, the one or more hardware processors 104 are configured to dynamically update the optimal path from the tracked current spatial location of the user to the destination based on feedback obtained from one or more user interaction modalities. The feedback obtained from one or more user interaction modalities help in redirecting the user in case of any turnings, obstacles present, and deviation from the optimal path by alarming the user and thereby update the optimal path. For example, if an obstacle is found on the optimal path which blocks the optimal path, then path regeneration is triggered to help the users avoid the optimal path. Further, a crowded area within an indoor environment can be used as an input for the system of the present disclosure to regenerate a path for the user avoiding the crowded area thus helping in the path planning. This is particularly helpful for people with disability as they usually show reluctance in crossing crowded areas in order to avoid accidents and unwanted attention. In an embodiment, a multi-modal conversational interface is provided to address communication challenges of the users with different disabilities by choosing appropriate user interaction modality, wherein the user interaction modality is selected based on the user profiling information. In an embodiment, the one or more hardware processors are configured to detect one or more obstacles present on the optimal path using an obstacle detector. Here, the obstacle detector detects one or more obstacles using a combination of (i) computer vision techniques utilizing a plurality of data continuously captured by a camera to detect the one or more obstacles with a first range of view and (ii) one or more ultrasonic sensors to detect the one or more obstacles with a second range of view. For example, as a navigational session starts, the camera and the one or more ultrasonic sensor start capturing data. The plurality of data captured by the camera is used to provide information of an upcoming obstacle falling on the optimal path to the user. The information of the upcoming obstacle may include but not limited to distance of the obstacle from the user, what the obstacle is and the like. The plurality of data continuously captured by the camera helps in detecting the upcoming obstacles with a first range of view (alternatively referred as a broader range of view). In an embodiment, the upcoming obstacles do not include the obstacles that are lying on a floor only but also the obstacles that are not placed on the floor such as an open window, swinging door, head/chest level obstacles that might not be realised by a person with visual impairment using a cane alone, and the like. Here the first range of view refers to a distance up till which the camera can capture which is determined using a pixel based distance measuring for depth measurement along with computer vision for object detection. Further, the one or more ultrasonic sensors detect the one or more obstacles with a second range of view. Here, the second range of view refers to a smaller area range around the user (e.g. near proximity of the user to 2-3 m) to provide immediate alerts for less distance obstacles.

Now, as the user moves in the indoor environment, then using the plurality of data captured using the camera, the one or more obstacles are added as upcoming obstacle before even the one or more obstacles come in proximity of the user. While in case of the one or more ultrasonic sensors, if any immediate obstacle comes in proximity (e.g., something falls in the way, a person suddenly comes in front) of the user, it is detected. In other words, when the user moves, then any obstacle present on the optimal path is captured even before the user physically arrives near the obstacle and the system of the present disclosure would have apriori knowledge that such an obstacle would fall at a given distance from where it was captured. This way a comprehensive feedback for upcoming obstacle awareness and immediate obstacle alert is covered along with distance from the obstacle and information of the obstacle. In an embodiment, the obstacle detector could be standalone small device connected to the mobile device implementing the system 100 and can be carried by the user in pocket.

In an embodiment, the feedback obtained from the one or more user interaction modalities for dynamically updating the optimal path include (i) feedback obtained from the obstacle detector, haptic feedback, voice instructions-based feedback, and visual interactions-based feedback. For example, a deaf user is not given voice instructions-based feedback, the selected user interaction modality for giving feedback to a deaf user may include visual interaction-based feedback, haptic feedback such as beep or vibrations, and feedback obtained from the obstacle detector for obstacle avoidance if any obstacle is present on the optimal path. Similarly, the selected user interaction modality for giving feedback to a blind user may include voice instructions-based feedback, haptic feedback such as beep or vibrations, and feedback obtained from the obstacle detector.

Figure 3:
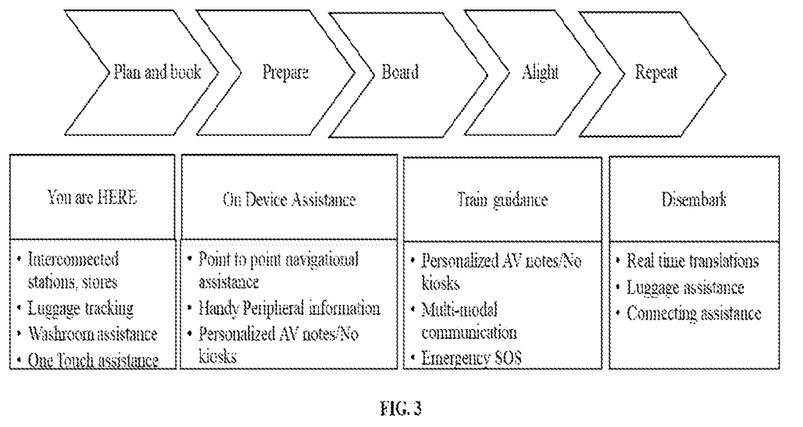
FIG. 3 illustrates a non-limiting example of railway journey adaption to the system and method for performing inclusive indoor navigation, in accordance with some embodiments of the present disclosure.

FIG. 3 illustrates a non-limiting example of railway journey adaption to the system and method for performing inclusive indoor navigation, in accordance with some embodiments of the present disclosure. The system of the present disclosure can be added with different features and utilities keeping core navigation solution intact for any indoor environment without any changes to be made to the indoor environment. Referring to FIG. 3, for an integrated railway station, with the system of the present disclosure, the user can get real time updates of train, ask train related queries and in case of emergency contact RPF, check food pantry and so on. Further, based on online booked ticket, the system of present disclosure is capable of automatically fetching details and providing suggestion on some attractions of the railway station based on remaining time before arrival of the train or guide the user to a specific platform/ train coach in real time. The system of present disclosure also provides landmark guidance to few areas such platform of the user's train, exact compartment of the user's train, accessible washroom, food court, drinking water, book stalls with high precision and keep track of the user's luggage using RFID tags during journey.

Figure 4:
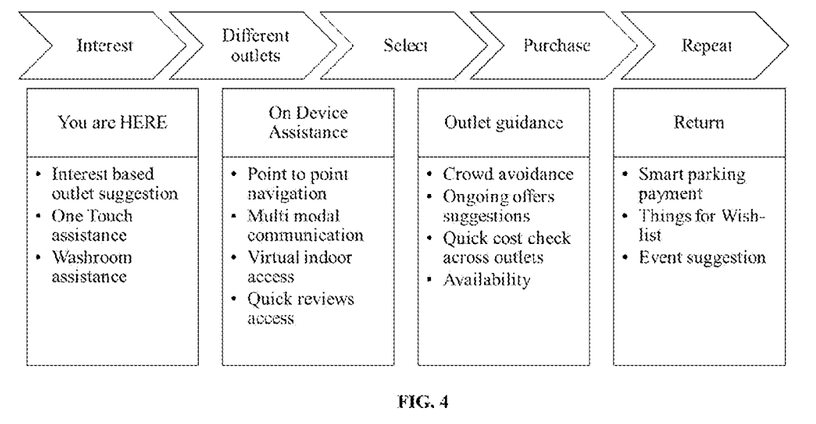
FIG. 4 illustrates a non-limiting example of mall adapted to the system and method for performing inclusive indoor navigation, in accordance with some embodiments of the present disclosure.

FIG. 4 illustrates a non-limited example of a mall adapted to the system and method for performing inclusive indoor navigation, in accordance with some embodiments of the present disclosure. As depicted in FIG. 4, as the user walks in a mall and inputs a desired destination, the system of the present disclosure determines an optimal path which is convenient with respect to distance from an initial location of the user to the destination, time to reach the destination and user profile. On user's way, different offers going on in different stores can be notified and after leaving an outlet, the user can be suggested for similar outlets in the same mall. Similarly, multiple other features depending on environment can be added to core solution.

Figure 5:
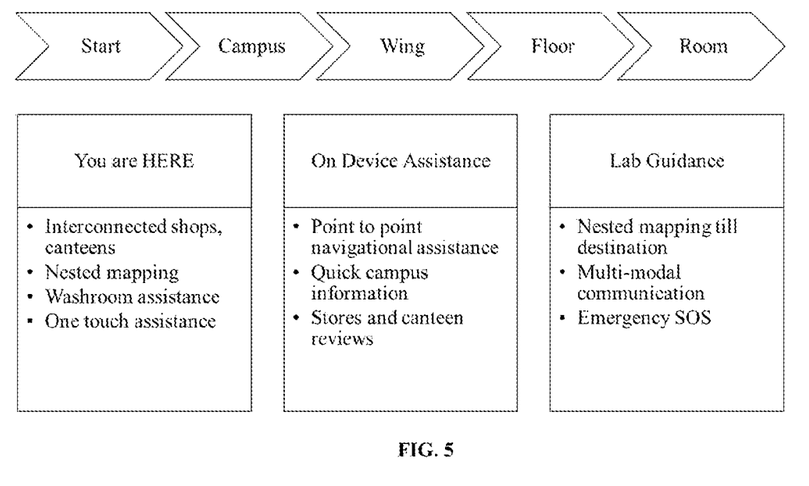
FIG. 5 illustrates a non-limiting example of academic institutions adapted to the system and method for performing inclusive indoor navigation, in accordance with some embodiments of the present disclosure.

FIG. 5 illustrates a non-limiting example of academic institutions adapted to the system and method for performing inclusive indoor navigation, in accordance with some embodiments of the present disclosure. The present disclosure would serve as a social contribution for students with disabilities and in providing common ground for both mainstream as well disabled students. For example, as shown in FIG. 5, as a disabled user walks in campus, a categorized view of institute/campus is provided which includes interconnected shops, canteens, washroom assistance and so on. Further, implementation of the system of present disclosure in such environments motivates people with disabilities and overcome their everyday challenge of navigation for which one needs to depend on others.

In an embodiment, the system of the present disclosure can be added with different features and utilities keeping core navigation solution intact for any indoor environment without any changes to be made to the indoor environment. Few high impact non-limiting use cases include retail, public transport, public buildings wherein retail further includes malls, supermarket and theatres. Similarly, public transport includes railway stations, airport and bus stations. Public buildings may include hospitals wherein the system of the present disclosure can be integrated with hospital system. For example, a user enters hospital then as per the user's medical case, he/she is guided to respective doctor. Further, as the doctor updates in his/her system the required tests, the system of the present disclosure guides the user to respective labs. The public buildings use cases may further include government offices, museums, amusement parks, and/or the like. Since the system of the present disclosure tracks the user in indoor space, thus for a fire evacuation use case, there could be two ways including proactive support and rescue team help. Firstly, the system of the present disclosure can notify the user to nearest escape and secondly, it may help rescue teams to reach and identify the user within the indoor space to rescue.

In an embodiment, the system of present disclosure provides the user with an additional favourite's functionality in which the user can mark a few destinations in his/her favourite's list. For example, a user can save his/her cabin in his/her favourite list as 'work' that may allow him/her to not enter his/her cabin location as destination every time rather he/she can directly ask for route of 'work'.

The present disclosure for performing inclusive indoor navigation is independent of internet as it performs all the processing on a mobile or handheld device itself. This reduces time of whole navigational experience as real time data is being used and processed on the mobile device itself without first going to a server then processing the data and then returning output to the mobile device. The system of present disclosure provides a companion guidance which is an additional feature to give a human touch to the system creating a higher user engagement. The system of present disclosure includes virtual companion which communicates with the user.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims (when included in the specification), the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope indicated by the following claims.

What is claimed is:

1. A processor implemented method, comprising:
    obtaining, by one or more hardware processors, nested environment data of a facility for indoor navigation performed by a user, wherein
        the nested environment data is stored on and retrieved from a server, and
        the nested environment data of the facility is obtained by:
            evaluating a plurality of floor exit maps of each floor of a plurality of floors against an evaluation criterion, wherein the evaluation criterion is used to check real world architectural details of the facility;
            creating, based on a mismatch between the plurality of floor exit maps and the evaluation criterion, a two-dimensional digital map of each floor among the plurality of floors of the facility;
            sequentially arranging the created two-dimensional digital map of each floor of the plurality of floors of the facility;
            determining, based on the sequential arrangement, a nested map of the facility; and
            performing map labelling to localize and capture information of a plurality of landmarks in the nested map, wherein
                the map labelling refers to adding details to the plurality of landmarks with respect to the created two-dimensional digital map along with capturing surrounding information of the plurality of landmarks,
                each landmark of the plurality of landmarks is tagged to a reference surroundings based on one or more parameters in the created two-dimensional digital map,
                the one or more parameters include images of the plurality of landmarks, text or signages of the plurality of landmarks, a direction of the plurality of landmarks, and a Wireless Fidelity (Wi-Fi) signal strength and a magnetic field intensity of the plurality of landmarks;
    receiving, by the one or more hardware processors, a destination location within the facility from the user;
    estimating, using a surrounding recognition machine learning model implemented by the one or more hardware processors, a current spatial location of the user with a predefined precision range at centimeter (cm) level by identifying (i) a user specific area in the facility using the surrounding recognition machine learning model trained with a plurality of real world images of the facility and (ii) the current spatial location of the user with respect to the identified user specific area by triangulating input data received from a plurality of sensors;
    determining, by the one or more hardware processors, an optimal path from the current spatial location to the destination location using the nested environment data, wherein the optimal path from the current spatial location to the destination location is categorized as (i) a convenient path (ii) a multi-destination path, or (iii) a shortest path in accordance with one or more user constraints, wherein
        the convenient path is a path with multiple destinations,
        the one or more user constraints include user profiling information,
        the convenient path is selected based on the one or more user constraints, a minimum time from the current spatial location to the destination location, and a minimum distance from the current spatial location to the destination location,
        the multi-destination path is a path that is longest with respect to a time and a distance and covers all important landmarks within the facility,
        the shortest path is a path that is shortest with respect to the time and the distance from the current spatial location to the destination location, and
        the user profiling information refers to details of physical appearance of the user and is indicative of whether the user is a physically fit person without any disability;
    tracking, using an augmented reality technique implemented by the one or more hardware processors, the current spatial location of the user while the user navigates on the optimal path from the current spatial location to the destination location; and
    detecting one or more obstacles present on the optimal path using an obstacle detector coupled with the one or more hardware processors, wherein the obstacle detector detects the one or more obstacles using a combination of:
        (i) computer vision techniques utilizing data continuously captured by a camera to detect the one or more obstacles with a first range of view, and
        (ii) one or more ultrasonic sensors to detect the one or more obstacles with a second range of view, wherein the second range of view refers to a small area range around the user to provide immediate alerts for less distance obstacles, and the small area range is 2 meters-3 meters;
    determining, by the one or more hardware processors, based on the data that is continuously captured by the camera, a pattern of the one or more obstacles;
    providing, by the one or more hardware processors, the determined pattern as input to the one or more ultrasonic sensors;
    predicting, via the one or more ultrasonic sensors coupled with by the one or more hardware processors, one or more incoming obstacles based on the determined pattern, wherein the one or more incoming obstacles are different from the detected one or more obstacles; and dynamically updating, by the one or more hardware processors, the optimal path from the tracked current spatial location of the user to the destination location based on a feedback obtained from one or more user interaction modalities.

2. The method of claim 1, wherein the one or more user constraints further include information of landmark of interest, a distance from an initial location of the user to the destination location, and the time to reach the destination location.

3. The method of claim 1, wherein the predefined precision range of the current spatial location of the user is between 10 cm to 20 cm.

4. The method of claim 1, further comprising:
detecting a deviation in a direction of the user from a preplanned direction on the optimal path; and
detecting an obstacle in the optimal path of the user based on the detected deviation in the direction of the user from the preplanned direction on the optimal path.

5. The method of claim 1, wherein the feedback obtained from the one or more user interaction modalities includes a feedback obtained from the obstacle detector, a haptic feedback, a voice instructions-based feedback, and a visual interactions-based feedback.

6. A system comprising:
one or more data storage devices operatively coupled to the one or more hardware processors and configured to store instructions configured for execution via the one or more hardware processors to:
obtain nested environment data of a facility for indoor navigation performed by a user, wherein
the nested environment data is stored on and retrieved from a server, and
the nested environment data of the facility is obtained by:
evaluating a plurality of floor exit maps of each floor of a plurality of floors against an evaluation criterion, wherein the evaluation criterion is used to check real world architectural details of the facility;
creating, based on a mismatch between the plurality of floor exit maps and the evaluation criterion, a two-dimensional digital map of each floor among the plurality of floors of the facility;
sequentially arranging the created two-dimensional digital map of each floor of the plurality of floors of the facility;
determining, based on the sequential arrangement, a nested map of the facility; and
performing map labelling to localize and capture information of a plurality of landmarks in the nested map, wherein
the map labelling refers to adding details to the plurality of landmarks with respect to the created two-dimensional digital map along with capturing surrounding information of the plurality of landmarks,
each landmark of the plurality of landmarks is tagged to a reference surroundings based on one or more parameters in the created two-dimensional digital map,
the one or more parameters include images of the plurality of landmarks, text or signages of the plurality of landmarks, a direction of the plurality of landmarks, and a Wireless Fidelity (Wi-Fi) signal strength and a magnetic field intensity of the plurality of landmarks;

receive a destination location within the facility from the user;

estimate, using a surrounding recognition machine learning model, a current spatial location of the user with a predefined precision range at centimeter (cm) level by identifying (i) a user specific area in the facility using the surrounding recognition machine learning model trained with a plurality of real world images of the facility and (ii) the current spatial location of the user with respect to the identified user specific area by triangulating input data received from a plurality of sensors;

determine an optimal path from the current spatial location to the destination location using the nested environment data, wherein the optimal path from the current spatial location to the destination location is categorized as (i) a convenient path (ii) a multi-destination path, or (iii) a shortest path in accordance with one or more user constraints, wherein
the convenient path is a path with multiple destinations,
the one or more user constraints include user profiling information,
the convenient path is selected based on the one or more user constraints, a minimum time from the current spatial location to the destination location, and a minimum distance from the current spatial location to the destination location,
the multi-destination path is a path that is longest with respect to a time and a distance and covers all important landmarks within the facility,
the shortest path is a path that is shortest with respect to the time and the distance from the current spatial location to the destination location, and
the user profiling information refers to details of physical appearance of the user and is indicative of whether the user is a physically fit person without any disability;

track, using an augmented reality technique, the current spatial location of the user while the user navigates on the optimal path from the current spatial location to the destination location; and detect one or more obstacles present on the optimal path using an obstacle detector, wherein the obstacle detector detects the one or more obstacles using:
(i) computer vision techniques utilizing data continuously captured by a camera to detect the one or more obstacles with a first range of view, and
(ii) one or more ultrasonic sensors to detect the one or more obstacles with a second range of view, wherein the second range of view refers to a small area range around the user to provide immediate alerts for less distance obstacles, and the small area range is 2 meters-3 meters;

determine, based on the data that is continuously captured by the camera, a pattern of the one or more obstacles;

provide the determined pattern as input to the one or more ultrasonic sensors;

predict, via the one or more ultrasonic sensors, one or more incoming obstacles based on the provided pattern, wherein the one or more incoming obstacles are different from the detected one or more obstacles; and dynamically update the optimal path from the tracked current spatial location of the user to the destination location based on a feedback obtained from one or more user interaction modalities.

7. The system of claim 6, wherein the one or more user constraints further information of landmark of interest, a distance from an initial location of the user to the destination location, and a time to reach the destination location.

8. The system of claim 6, wherein the predefined precision range of the current spatial location of the user is between 10 cm to 20 cm.

9. The system of claim 6, wherein the one or more hardware processors are further configured to:

detect a deviation in a direction of the user from a preplanned direction on the optimal path; and detect an obstacle in the optimal path of the user based on the detected deviation in the direction of the user from the preplanned direction on the optimal path.

10. The system of claim 6, wherein the feedback obtained from the one or more user interaction modalities includes a feedback obtained from the obstacle detector, haptic feedback, voice instructions-based feedback, and visual interactions-based feedback.

11. One or more non-transitory machine readable information storage mediums comprising one or more instructions which when executed by one or more hardware processors causes:

Obtaining nested environment data of a facility for indoor navigation performed by a user, wherein the nested environment data is stored on and retrieved from a server, and the nested environment data of the facility is obtained by:

evaluating a plurality of floor exit maps of each floor of a plurality of floors against an evaluation criterion, wherein the evaluation criterion is used to check real world architectural details of the facility;

creating, based on a mismatch between the plurality of floor exit maps and the evaluation criterion, a two-dimensional digital map of each floor among the plurality of floors of the facility;

sequentially arranging the created two-dimensional digital map of each floor of the plurality of floors of the facility;

determining, based on the sequential arrangement, a nested map of the facility; and performing map labelling to localize and capture information of a plurality of landmarks in the nested map, wherein the map labelling refers to adding details to the plurality of landmarks with respect to the created two-dimensional digital map along with capturing surrounding information of the plurality of landmarks, each landmark of the plurality of landmarks is tagged to a reference surroundings based on one or more parameters in the created two-dimensional digital map, the one or more parameters include images of the plurality of landmarks, text or signages of the plurality of landmarks, a direction of the plurality of landmarks, and a Wireless Fidelity (Wi-Fi) signal strength and a magnetic field intensity of the plurality of landmarks;

receiving a destination location within the facility from the user;

estimating using a surrounding recognition machine learning model implemented, a current spatial location of the user with a predefined precision range at centimeter (cm) level by identifying (i) a user specific area in the facility using the surrounding recognition machine learning model trained with a plurality of real world images of the facility and (ii) the current spatial location of the user with respect to the identified user specific area by triangulating input data received from a plurality of sensors;

determining, an optimal path from the current spatial location to the destination location using the nested environment data, wherein the optimal path from the current spatial location to the destination location is categorized as (i) a convenient path (ii) a multi-destination path, or (iii) a shortest path in accordance with one or more user constraints, wherein the convenient path is a path with multiple destinations, the one or more user constraints include user profiling information, the convenient path is selected based on the one or more user constraints, a minimum time from the current spatial location to the destination location, and a minimum distance from the current spatial location to the destination location, the multi-destination path is a path that is longest with respect to a time and a distance and covers all important landmarks within the facility, the shortest path is a path that is shortest with respect to the time and the distance from the current spatial location to the destination location, and the user profiling information refers to details of physical appearance of the user and is indicative of whether the user is a physically fit person without any disability;

tracking, using an augmented reality technique implemented, the current spatial location of the user while the user navigates on the optimal path from the current spatial location to the destination location; and detecting one or more obstacles present on the optimal path using an obstacle detector, wherein the obstacle detector detects the one or more obstacles using a combination of:

(i) computer vision techniques utilizing data continuously captured by a camera to detect the one or more obstacles with a first range of view, and (ii) one or more ultrasonic sensors to detect the one or more obstacles with a second range of view, wherein the second range of view refers to a small area range around the user to provide immediate alerts for less distance obstacles, and the small area range is 2 meters-3 meters;

determining, based on the data that is continuously captured by the camera, a pattern of the one or more obstacles;

providing the determined pattern as input to the one or more ultrasonic sensors;

predicting, via the one or more ultrasonic sensors, one or more incoming obstacles based on the determined pattern, wherein the one or more incoming obstacles are different from the detected one or more obstacles; and dynamically updating, the optimal path from the tracked current spatial location of the user to the destination location based on a feedback obtained from one or more user interaction modalities.

* * * * *